United States Patent
Lee et al.

(10) Patent No.: US 9,168,924 B2
(45) Date of Patent: Oct. 27, 2015

(54) SYSTEM DIAGNOSIS IN AUTONOMOUS DRIVING

(75) Inventors: Jin-Woo Lee, Rochester Hills, MI (US); Bakhtiar Brian Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 352 days.

(21) Appl. No.: 13/430,258

(22) Filed: Mar. 26, 2012

(65) Prior Publication Data

US 2013/0253767 A1    Sep. 26, 2013

(51) Int. Cl.
  *B62D 6/00* (2006.01)
  *G06F 7/00* (2006.01)
  *B60W 30/12* (2006.01)
  *B60W 50/04* (2006.01)
  *B62D 15/02* (2006.01)

(52) U.S. Cl.
  CPC ............... *B60W 30/12* (2013.01); *B60W 50/04* (2013.01); *B62D 15/025* (2013.01); *B60W 2540/18* (2013.01)

(58) Field of Classification Search
  CPC ..................................................... B60W 30/12
  USPC ............................................... 701/41, 42, 43
  See application file for complete search history.

(56) References Cited

U.S. PATENT DOCUMENTS

| | | | |
|---|---|---|---|
| 7,418,372 B2* | 8/2008 | Nishira et al. | 701/96 |
| 2008/0208410 A1* | 8/2008 | Katrak et al. | 701/42 |
| 2010/0228420 A1* | 9/2010 | Lee | 701/26 |
| 2011/0130926 A1* | 6/2011 | Lu et al. | 701/42 |
| 2011/0144865 A1* | 6/2011 | Niemz | 701/42 |
| 2011/0178671 A1* | 7/2011 | Bae et al. | 701/29 |

* cited by examiner

*Primary Examiner* — John Q Nguyen
*Assistant Examiner* — Anshul Sood
(74) *Attorney, Agent, or Firm* — Mark S. Cohen; Pearl Cohen Zedek Latzer Baratz LLP

(57) ABSTRACT

A lane controller system installed on a vehicle may include components for self-diagnosing malfunctions on the vehicle. The system may include a desired path generator for generating a desired path that keeps the vehicle within a road lane; a steering controller for providing steering a steering correction to keep the vehicle within the road lane; a vehicle state estimator for estimating the state of the vehicle; a lane marking detector for detecting position of road lane markings; a path predictor for predicting a path actively followed by the vehicle; a virtual dynamics module for modeling the anticipated path of the vehicle following input of the steering controller; a comparer that compares the results of actual steering corrections applied with those predicted by the virtual dynamics module, and a diagnostic system that determines a root cause of malfunctions, based on the comparison by the comparer.

11 Claims, 7 Drawing Sheets

SYSTEM DIAGNOSIS IN AUTONOMOUS DRIVING

BACKGROUND

Lane departure warning systems are designed to warn a driver of a vehicle when the vehicle begins to move out of its lane without a turn signal being activated by the driver to indicate that the lane change is intentional. Such lane departure warning systems may be used on freeways and arterial roads and supply a visual, audible, and/or vibration warning if the vehicle is leaving its lane. These departure warning systems may be designed to minimize accidents by addressing the main causes of collisions: driver error, distractions and drowsiness. There are also lane keeping systems that not only warn the driver that the vehicle is straying from the center of its lane, but if no action is taken by the driver, automatically take steps to ensure the vehicle stays in its lane.

Lane centering systems may further assist the driver by maintaining the vehicle's position at the center of a lane. Lane centering systems may be composed of many units, including sensors, computers, actuators, communication modules and other systems and components. Since lane centering systems automatically correct the movement of a vehicle, a driver of the vehicle may not be aware of malfunctions that exist.

SUMMARY

Embodiments are directed to providing lane controller for installing within a host vehicle, the lane controller comprising: (i) a desired path generator for generating a desired path for keeping the host vehicle within a lane of a road; (ii) a steering controller for providing steering instructions to apply a steering correction for keeping the vehicle within the lane as determined by the desired path generator; (iii) a vehicle state estimator for estimating the state of the vehicle; (iv) a lane marking detector for detecting position of lane markings indicating the lane; (v) a path predictor for predicting a path actively followed by the vehicle, wherein the steering commands applied by the steering controller is in accordance with input from the lane marking detector for providing feedback to the desired path generator to correct the desired path generated by the path generator, and further comprising: (vi) a virtual dynamics module for modeling the anticipated path of the vehicle following input of the steering controller; (vii) a comparer for comparing the results of actual steering corrections applied with those predicted by the virtual dynamics module, and a diagnostic system for diagnosing a root cause of any discrepancies above a threshold.

Some embodiments provide lane monitoring functionality to provide a warning to the driver.

Where a warning is provided, the warning may be selected from the group comprising visual warnings, audible warnings, tactile warnings and combinations thereof.

Some embodiments provide lane keeping functionality wherein the steering controller provides a control signal to an assisted or automated steering system.

In some embodiments, the steering controller may provide control signals to one to the group comprising electrical power steering systems (EPS), active front steering systems (AFS) and systems for applying braking to individual wheels.

In some embodiments, the lane controller is linked to at least one sensor for monitoring the road.

In some embodiments, the at least one sensor for monitoring the road is selected from the group consisting of: video sensors in the visual domain, laser sensors, infrared sensors, stereo cameras, radar sensors, and GPS/map positioning sensors.

In some embodiments, monitoring the road comprises monitoring at least one of dashed lane markings, solid white lines, double lines and colored lines.

In some embodiments, the controller is linked to at least one of the group consisting of global positioning systems (GPS), maps, and roadside infrastructures.

In some embodiments, the lane controller may apply a steering correction via at least one of the group consisting of a steering angle and a steering torque.

In some embodiments, the threshold is a variable threshold dependent on at least one factor selected from the group consisting of vehicle speed, a road condition, curvature of the road, steering system dynamics and type of vehicle.

In some embodiments, the root cause diagnosed by the diagnostic system is selected from the group consisting of externalities, mechanical malfunctioning of the steering system and sensor misalignment.

In some embodiments, the root cause diagnosed by the diagnostic system is selected from the group consisting of wheel imbalance, wheel mis-alignment, flat tires, EPS torque imbalance, lane sensor mis-positioning, camera mis-positioning and camera mis-alignment in yaw angle. The diagnostic system may diagnose or discover other root causes.

In some embodiments, the comparer receives input concerning actual steering correction from at least one vehicle dynamics measurement device wherein the at least one vehicle dynamics measurement device monitors at least one of the group comprising steering angle, steering torque, steering direction, angular acceleration, linear acceleration, yaw-rate, velocity, speed and wheel rotation.

In some embodiments, the comparer receives input concerning an actual steering correction from at least one vehicle dynamics measurement device including at least one of the group consisting of steering angle sensors and steering torque sensors associated with a component of the steering system.

In some embodiments, the component of the steering system is selected from the group comprising steering wheels, steering columns, steering rack and pinions and vehicle axles.

In some embodiments, the comparer receives input concerning the actual steering correction from at least one vehicle dynamics measurement device selected from the group consisting of accelerometers, speedometers, wheel speed sensors, and inertial measurement units (IMU).

In some embodiments, the measured vehicle dynamics are received from at least one vehicle dynamics measurement device via a wire link such as a controller area network (CAN) bus Flexray or Ethernet, or via a wireless link.

In some embodiments, the lane controller is part of a system for lane monitoring, lane keeping, lane centering, or lane changing; the system may include at least one processor, memory, long term storage, at least one user input component, and at least one output component.

In some embodiments, the system further comprises a data base selected from the group of freestanding databases and databases within the memory or long term storage.

In some embodiments, the at least one input component is selected from the group consisting of touch-screens, keyboards, microphones and pointer devices.

In some embodiments, the at least one output components is selected from the group consisting of display screens, tactile outputs and audio devices.

An embodiment of the invention is directed to a method for self-diagnosis of malfunctions comprising the steps of: (d) on receiving a request from driver for lane centering assistance checking that lane centering functionality is actually available and engaging the lane centering system; (e) calculating the appropriate lane centering adjustment; (f) applying the adjustment to the car via the steering controller; (g) applying the adjustment of step (e) to the virtual vehicle dynamics module; (h) recording actual vehicle motion caused by the steering adjustment (of step f); (i) calculating the anticipated vehicle motion; (j) comparing the actual recorded motion and the calculated anticipated vehicle motion, over an appropriate distance; (k) where the difference detected is less than a threshold amount, recalculating the appropriate lane centering adjustment; whereas (l) if, however, a difference exceeding a predetermined threshold is detected, running diagnostic logic to diagnose the cause.

The method may further comprise initiating steps of: (a) checking if the lane centering system is engaged or disengaged; (b) if the lane centering system is disengaged, checking if the driver is requesting lane centering assistance; if the driver is not requesting lane centering assistance, (c) rerunning steps 'a' and 'b' according to a schedule selected from the group consisting of continuously during a journey, at particular points of a journey, when the vehicle moves from a substantially stationary position, where an onboard computer detects freeway or highway driving, where a GPS is activated, during and on-road driving, intermittently every predetermined distance interval and every predetermined time interval.

In some embodiments, the method further comprises first providing a lane centering controller comprising (i) a desired path generator for generating a desired path for keep the host vehicle within a lane of a road; (ii) a steering controller for provide steering instructions to apply a steering correction to keep the vehicle within the lane as determined by the desired path generator; (iii) a vehicle state estimator for estimating the state of the vehicle; (iv) a lane marking detector for detecting position of lane markings indicating the lane; (v) a path predictor for predicting a path actively followed by the vehicle, wherein the steering applied by the steering controller is in accordance with input from the lane marking detector for providing feedback to the desired path generator to correct the desired path generated by the path generator, (vi) a virtual dynamics module for modeling the anticipated path of the vehicle following input of the steering controller; (vii) a comparer for comparing the results of actual steering corrections applied with those predicted by the virtual dynamics module, and (viii) a diagnostic system for diagnosing root cause of any discrepancies above a threshold.

In some embodiments, diagnosing comprises checking whether a bias in steering torque exceeds a predetermined limit $\delta_{limit}$, in which case diagnosing an underlying cause as attributable to a steering malfunctioning, whereas if the bias in steering torque is less than the predetermined limit, attributing the malfunctioning to the sensor system.

In some embodiments, where the bias in steering torque exceeds the predetermined limit $\delta_{limit}$, diagnosing further comprises examining the match or mismatch of rack position of a rack and pinion steering system, such that in cases of no detectable rack position mismatch, diagnosing the cause as related to wheel imbalance or underpressured tires, whereas if there is a detectable rack position mismatch determining that steering is biased; wherein if the bias in the steering torque is less than $\delta_{limit}$, monitoring the driver's preferred lane offset such that where the offset is always biased, diagnosing lane sensor mispositioning, and if there is a continuous oscillatory motion even when travelling relatively straight roads, diagnosing a lane sensor misalignment in yaw angle.

In some embodiments, the lane sensor includes one or more cameras, such as a mono forward looking camera, stereo cameras, or a combination of forward and rear view cameras.

Some embodiments are directed to a computer software product for installing on a processor of a vehicle, the computer software product including a medium readable by a processor, the medium having stored thereon: (ii) a second set of instructions for receiving a request from driver for lane centering assistance, checking that lane centering functionality is actually available and engaging a lane centering system; (iii) a third set of instructions for calculating an appropriate steering adjustment; (iv) a fourth set of instructions for applying the adjustment to a steering mechanism of the vehicle; (v) a fifth set of instructions for providing a vehicle dynamics simulation; (vi) a sixth set of instructions for applying the adjustment to the vehicle dynamics simulation; (vii) a seventh set of instructions for recording actual vehicle motion caused by the steering adjustment; (viii) an eighth set of instructions for calculating the anticipated vehicle motion; (ix) a ninth set of instructions for comparing the actual recorded motion and the calculated anticipated vehicle motion, over an appropriate distance; (x) a tenth set of instructions that where the difference detected is less than a threshold amount, is for recalculating the appropriate lane centering adjustment; that where a difference exceeding a predetermined threshold is detected, runs an eleventh set of instructions for diagnosing a root cause.

In some embodiments, the medium further has stored thereon, (i) a first set of instructions for checking if the lane centering system is engaged or not and if not engaged, for checking if the driver has requested engaging the lane centering system, and if the lane centering system is available.

In some embodiments, the diagnosable root cause is selected from the group consisting of wheel imbalance, wheel misalignment, flat tires, EPS torque imbalance, lane sensor mispositioning, camera mispositioning and camera misalignment in yaw angle.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
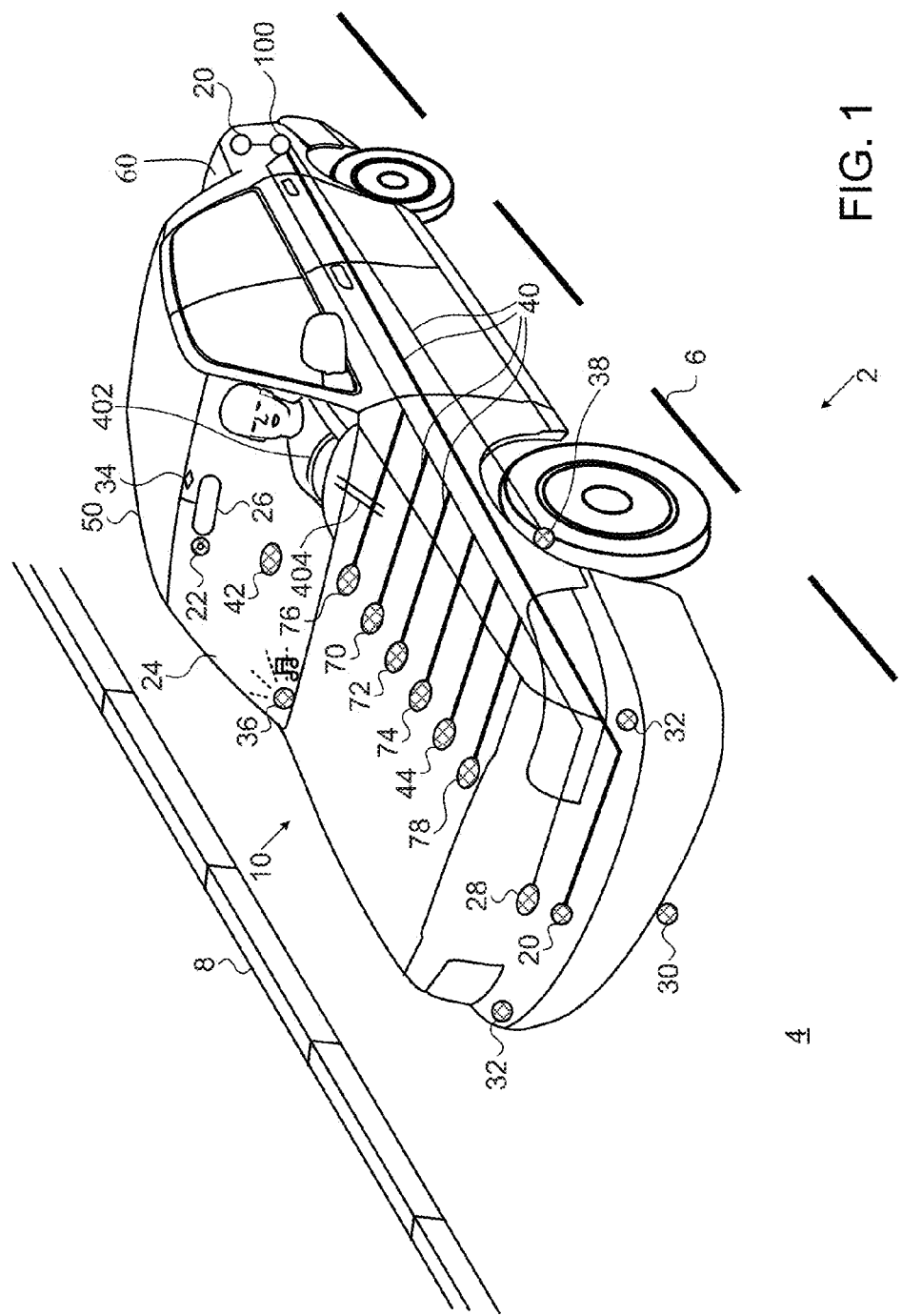
FIG. 1 is a schematic diagram of a vehicle with a lane centering system, according to an embodiment of the invention.

Where considered appropriate, reference numerals may be repeated among the figures to indicate corresponding or analogous elements.

DETAILED DESCRIPTION

In the following detailed description, numerous specific details are set forth in order to provide a thorough understanding of the invention. It will however be understood by those skilled in the art that the present invention may be practiced without these specific details. In other instances, well-known methods, procedures, and components have not been described in detail so as not to obscure the present invention.

Unless specifically stated otherwise, as apparent from the following discussions, it is appreciated that throughout the specification discussions utilizing terms such as "processing," "computing," "storing," "determining," "evaluating," "calculating," "measuring," "providing," "transferring," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Autonomous, semi-autonomous, automated, or automatic steering control features such as automated lane centering, adaptive lane centering or other similar systems may maintain or control the position of a vehicle with respect to the road with reduced driver input, particularly with reduced steering wheel movement. In order to comply with safety requirements, however, the driver may need to regain full control of the vehicle steering controls and deactivate or disengage the steering control system. The driver may need to regain control of the vehicle, for example, when another vehicle swerves into the driver's lane, an obstacle lies in front of the vehicle, the vehicle comes into close proximity with a guardrail, the driver switches lanes, or in other circumstances. If any of the lane centering components are defective while the automated lane centering system is activated, the driver may be unaware of such failures, since the automated lane centering system may compensate for any errors introduced by the defective components. Continuing to drive with such defective components may cause significant damage to the components. For example, if a driver operates the vehicle without being aware of wheel misalignment or imbalances, this may cause asymmetric wear out to the vehicle. When a driver encounters a circumstance requiring the driver to regain control of the steering quickly, knowing which components are defective may assist the driver in controlling the steering. Further an automated vehicle steering system override may have to be performed quickly and ahead of a severe malfunction. An automated vehicle steering override detection system may, therefore, be required to function with high precision in various driving scenarios including, at low speeds, high speeds, on curved roads, and on banked roads, for example. A lane controlling system having a diagnostic system or function may help the driver maintain the vehicle and drive safely. In addition, one may choose to disable the feature and inform the driver if the diagnostic system indicates anomaly.

At lower speeds more torque may be required to steer the vehicle than at high speeds; therefore, the minimum torque required to override the system may be higher at low speeds than high speeds. At higher speeds, less torque may be required to steer the vehicle than at low speeds; therefore, the minimum torque required to override the automated steering control system may be lower at high speeds to ensure the driver may easily regain control of the vehicle if needed.

When a vehicle turns while driving on a curved road or banked road, different steering torque may be required to steer the vehicle depending on the direction of the turn.

Some vehicles may be equipped with an adaptive or automatic lane centering feature or application. The feature may be integrated into the vehicle, but in some examples may be retrofitted to the vehicle. An adaptive lane centering feature may maintain a constant lane offset or vehicle position relative to a lane on the road the vehicle is driving upon. A computer vision sensor (e.g., a camera), LIDAR (Light Detection And Ranging sensor (also known as LADAR) sensor, or other type of sensor may measure data allowing an adaptive lane centering feature to determine the lane offset or relative location of the vehicle with respect to road features, such as, lane markers, road shoulders, median barriers, edge of the road and other objects or features. The relative location of the vehicle with respect to the road features may be determined based on, for example, global positioning system (GPS) location data, a map database of the vehicle, a forward facing camera measured relative distance to road features, and/or other information.

The adaptive lane centering feature may control the vehicle steering based on the determined relative position of the vehicle in order to maintain constant or relatively constant (e.g., with a resolution of 10 cm) vehicle lane offset or position within a lane. In some examples of systems including this feature, the adaptive lane centering feature may control the direction of vehicle travel by controlling the steering angle and/or steering torque of the vehicle by outputting a steering angle control command to an electrical power steering (EPS), active front steering (AFS), or other system. The adaptive lane centering feature may, in some embodiments, control the steering angle directly or with or without an AFS, EPS or other system.

A lane keeping assist application may automatically control the vehicle steering to ensure that the vehicle stays within a pre-determined lane or path on the road. A lane keeping assist application may be configured to only affect the steering of the vehicle if the vehicle begins to move out of a lane without the driver signaling his intention to do so, at which point the lane keeping assist system may automatically control the steering to maintain the vehicle within the lane.

A lane keeping assist feature may function by determining the relative position of the vehicle with respect to road features such as lane markers, road shoulders, median barriers, and the like, adjusting the steering control to maintain the vehicle within a lane.

The relative position of the vehicle with respect to road features may be determined based on the GPS location data of the vehicle, vehicle measured relative distance to road features, or other information. The lane keeping assist feature may control the vehicle steering based on the determined relative position of the vehicle in order to maintain the vehicle within a lane. The lane keeping assist feature may control the direction of vehicle travel by controlling the steering angle and/or steering torque of the vehicle by outputting a steering angle and/or steering torque control command to an EPS, an AFS, or other system. The lane keeping assist feature may, in some embodiments, control the steering angle directly or with or without an EPS, AFS or other system.

Some examples of automated steering control override systems may measure, estimate, or evaluate, using one or more sensors associated with the vehicle, vehicle steering measurements or vehicle steering conditions such as the steering angle and steering torque of a vehicle. Vehicle steering measurements or vehicle steering conditions may be measured, estimated, or evaluated at pre-determined intervals (e.g., every 10 milliseconds) while the vehicle is in motion. In some embodiments, automated steering control override detection system may measure steering angle conditions and steering torque conditions of a vehicle continuously while the vehicle is in motion. Other vehicle dynamics information, for example, speed, acceleration, heading, yaw-rate (yaw is veering to one side), lane offset, driver input, and other factors may also be measured.

Some vehicle automated steering override detection systems may determine, based on the measured vehicle steering measurements, such as steering torque, steering angle, speed, acceleration, heading, yaw-rate, driver inputs, and the like, whether to override, deactivate, or disengage an automated vehicle steering control system. Some systems may, for example, be employed while a vehicle automated steering system is engaged, activated or functioning.

The vehicle automated steering override detection system may measure the steering angle, steering torque, angular acceleration, lateral acceleration, speed, yaw-rate and/or other vehicle dynamics or steering measurements while the vehicle automated steering control system is activated.

An automatic vehicle control system may be activated and may output a steering angle command to an automated steering override detection system. An automated steering override detection system may based on, for example, the steering angle command calculate an expected steering angle and/or expected steering torque. The automated steering override detection system may compare the expected steering angle and/or expected steering torque to sensor measured steering angle and/or sensor measured steering torque. If the absolute value of the difference between measured steering torque and the expected steering torque is greater than a predetermined threshold torque value, then an automated steering control system may be disengaged. If the absolute value of the difference between measured steering angle and the expected steering angle is greater than a predetermined threshold steering angle value, then an automated steering control system may be disengaged.

In some examples, an automated steering override detection system may disengage an automated steering control system if the absolute value of the difference between measured steering angle and the expected steering angle is greater than a predetermined threshold steering angle value and/or the absolute value of the difference between measured torque and the expected steering torque is greater than a predetermined threshold torque value. The predetermined threshold steering angle and predetermined threshold torque values may depend or vary based on vehicle speeds, road conditions, curvature of the road, steering system dynamics, type of vehicle, and/or other factors. Other or different vehicle steering or vehicle dynamics measurements may factor into the decision to override.

Lane departure warning systems may warn the driver if it appears the vehicle is beginning to drift out of its lane. Warnings may be provided to the driver by a tactile signal such as a vibration from a vibration mechanism coupled to the seat or steering wheel to alert the driver of deviations from the lane. In some embodiments, an audible tone or alarm is emitted. In some embodiments, a visible warning indicator such as a flashing dashboard icon on the dashboard is illuminated. Some systems may issue an audiovisual warning.

Lane departure warning systems may recognize dashed lane markings, and may provide warning when a white lane marking is being crossed. If a yellow or orange line marking or double line is crossed a stronger warning may be generated.

Lane departure warning systems may also combine prevention with risk reports in the transportation industry. For example, video-based technology may be used to assist fleets in lowering their driving liability costs. By providing safety managers with driver- and fleet-risk assessment reports and tools, such systems facilitate proactive coaching and training and may eliminate or at least mitigate high-risk behaviors. In such systems, a lane departure alert may be sent remotely to a manager via a mobile phone. According to an embodiment of the invention, lane departure warning systems and other lane controller systems may include a diagnostic function or system to determine which vehicle components are defective. Problems such as lane sensor mis-positioning, camera mis-positioning and camera mis-alignment may be diagnosed.

Some lane keeping systems utilize stability control systems to assist the driver in maintaining lane position by applying gentle brake pressure on the appropriate wheels.

Some systems use EPS (Electric Power Steering) which may be applied to steer the vehicle, assisting it in hold to its lane.

A counter-steering torque may be applied to help ensure the driver does not over-correct the steering wheel while attempting to return the vehicle to its proper lane.

In one embodiment, a lane-detection camera may be integrated with the electric power-steering system; so that when a lane departure is detected which appears unintended, since the turn indictor signal is not engaged to indicate the driver's desire to change lanes, the electric power-steering system introduces a gentle torque that helps guide the driver back toward the center of the lane.

A lane keeping function or lane keeping assist may operate to help reduce the driver's steering-input burden by providing steering torque; however, the driver must remain active or the system will deactivate. Thus a lane keeping assist system may provide much of the steering torque necessary, to keep the car in its lane on the highway, thereby making highway driving less cumbersome, by minimizing the driver's steering input, perhaps by as much as 80%.

With reference to FIG. 1, common to all the above systems, is a computer sub-system known hereinafter as a lane centering system 90 that includes a lane centering controller 100 that receives input from one or more sensors 20 attached to or associated with the vehicle 10. The lane centering controller 100 may maintain or control the position of vehicle 10 with respect to the road 2 in general and to road lanes 4 in particular, based on the sensor 20 measured relative location of the vehicle 10 with respect to road features such as dashed lane markings 6 and road boundaries 8.

Lane departure warning systems and lane keeping systems may be based on a variety of sensors. These may include:
 video sensors 22 in the visual domain, which may be mounted behind the windshield 24, typically alongside the rear view mirror 26
 Laser sensors 28 which may be mounted on the front of the vehicle
 Infrared sensors 30 which may be mounted either behind the windshield 24 or under the vehicle
 In some systems, stereo cameras 32 may be used with sophisticated object- and pattern-recognition processors
 Radar sensors 34 or GPS/Map positioning systems
 In one such system, a camera 34 mounted in the overhead console above the mirror 26 monitors the lane markings 6 on a roadway 2. A warning tone 36 is triggered to alert the driver when the vehicle 10 begins to drift over the markings 6.

Some systems use infrared sensors 30 to monitor lane markings 6 on the surface of the road 2. Other systems use a camera 34 to track road markings 2, such as forward-looking video-cameras 22 operating in the visible range. Some systems use optical sensors 38 on both sides of the car.

In one system a camera 34, mounted at the top of the windshield 24 just above the rear-view mirror 26 may scan the road 2 ahead in a 40-degree radius, picking up the dashed 6 white lines used to divide lane 4 boundaries on the highway or road 2. The lane centering system 90 recognizes that the driver is driving within a particular lane 4, and monitors the sharpness of the curvature of the road 2 ahead, using factors such as yaw and vehicle speed to calculate the steering input required.

The lane centering system 90 may be combined with an Adaptive Cruise control (ACC). ACC for road vehicles 10 may use information from on-board sensors 22 only without using satellite or roadside infrastructures, or requiring cooperative support from other vehicles.

In some lane centering systems 90 and ACC systems, a GPS 42 is used to track the position of the vehicle 10 via satellite and in other systems. The system 90 may also communicate with other vehicles via vehicle to vehicle (V2V) communication technology and/or roadside infrastructure via vehicle to infrastructure (V2I) communication technology.

In some systems, medium distance sensor technology provides input corresponding to the road ahead and short distance sensor technology provides indication of how well the vehicle follows the twists and turns in the road. Other systems monitor driver input and compare to expected driver input.

The one or more sensors 20 may include a Light Detection And Ranging sensor (LIDAR or LADAR) 44, or other remote sensing device that may obtain data allowing the lane centering controller 100 to determine the relative location of the vehicle 10 with respect to road 2 features, such as lane markings 6, road shoulders, median barriers, the edge 8 of the road 2, and/or other objects or features. A camera 34 may, for example, measure lane offset, heading angle, lane curvature and/or other information, deriving speed, acceleration, yaw-rate and the like. The lane centering controller 100 also receives driver input, such as activation of turning indicators. In general, the lane centering system 90 is configured to detect a deviation from the correct position within the lane 4 and outputs a warning 36 to the driver or directly interacts with the steering 400, either by affecting the electrical power steering EPS 414 or Active Front Steering (AFS) 416, or by applying brakes to the individual wheels.

The sensors provided may be linked to the lane centering controller 100 by any of various known data links, including a wire link such as a controller area network (CAN) bus 40, Flexray or Ethernet, or via a wireless link.

Lane centering and lane keeping systems are computer implemented, and the heart of such systems is a lane centering controller 100 that may be part of a larger computer system for the vehicle 10. As with all computer systems, it may be configured in a number of ways.

Figure 2:
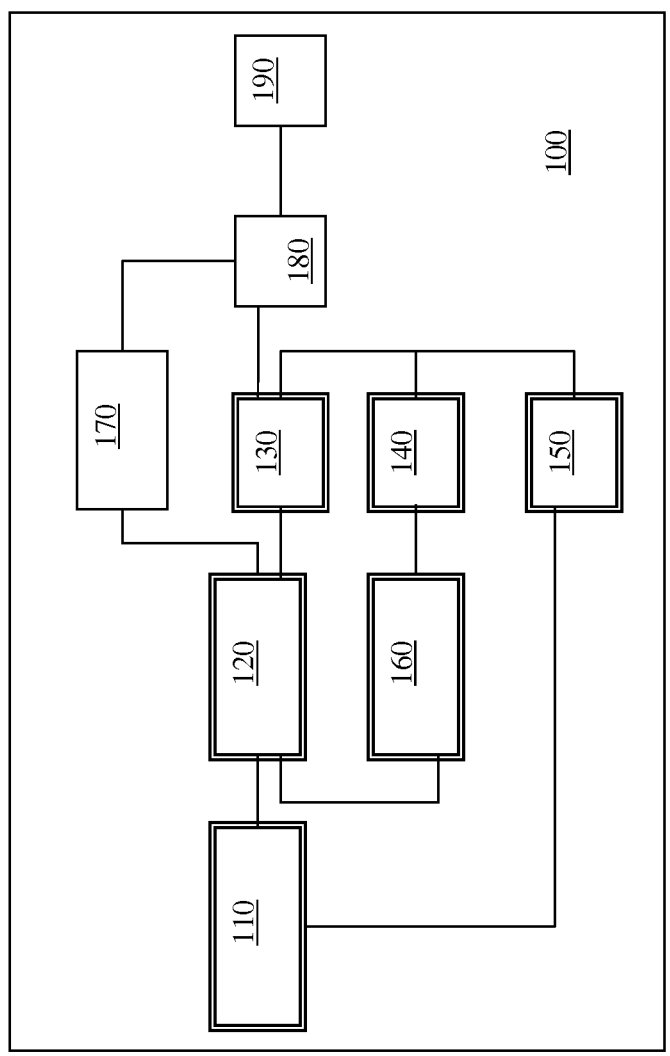
FIG. 2 is a functional block diagram of a controller according to an embodiment of the invention.

With reference to FIG. 2, the blocks with a double line border there-around represent a conceptual block diagram of one example of a computer subsystem known hereinafter as a lane centering controller 100.

Lane centering controller 100 includes a desired path generator 110, a steering controller 120, a steering system 130, a vehicle state estimator 140, a lane mark detector 150 and a path predictor 160.

Figure 3:
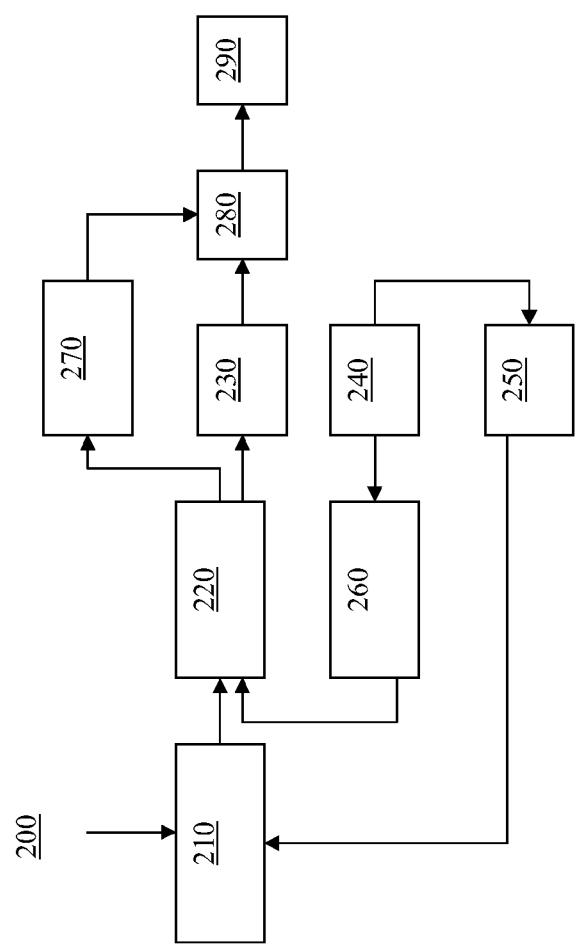
FIG. 3 is a flowchart showing how the blocks of the functional block diagram of FIG. 2 interact according to an embodiment of the invention.

In FIG. 3, a flowchart of how the functional modules interact is presented, according to an embodiment of the invention. Again, reference is made to the blocks with a double line border. With reference to FIG. 3 and with further reference to FIG. 2, when the lane centering controller 100 is engaged 200, the desired path generator 110 generates 210 a desired path intended to keep the vehicle in which the lane centering controller 100 is installed, centered within its lane. The steering controller 120 interacts with steering system 130, e.g. electrical power steering (EPS) of the vehicle by applying a steering correction 230 to keep the vehicle within the lane as determined by the desired path generator 110. The results of the steering correction 230 are determined by the vehicle state estimator 140 which estimates 240 the state of the vehicle, and the lane marking detector 150 which detects 260 the position of lane markings. The vehicle state estimator 140 provides data to the path predictor 160 for predicting the path that the vehicle is following, which is then used to correct 230 the steering applied by the steering controller 130 to the electrical power steering (EPS) 70 (or AFS 75, or individual wheel brakes). The lane marking detector 150 provides feedback to the desired path generation module 110 to correct the desired path generated 210.

It is a feature of embodiments of the present invention that the discrepancy between the predicted path and that actually followed by the vehicle 10, in other words, the correction or the additional steering applied by the steering system 130 or the detected compensation applied by the driver, may be used to diagnose the underlying cause of the correction.

Referring back to FIG. 2, embodiments of an improved lane centering controller 100 include a virtual vehicle dynamics module 170, a comparer 180 and a diagnostic system 190. With further reference to FIG. 2, the virtual vehicle dynamics module 170 takes output from the steering controller module 120 and creates 270 a virtual model of how the host vehicle should behave.

The comparer 180 compares 280 the output of the virtual vehicle dynamics module 170 with the output of the electrical power steering module 130, i.e. compares the anticipated steering correction applied by the driver of the EPS 70 to see if the required steering 230 required to keep the vehicle in lane, is over-steered or under-steered when compared with that predicted 270 by the virtual vehicle dynamics module 170.

Responsive to input from the comparison logic module 180, the diagnostic system 190 diagnoses the likely cause of the discrepancies. The diagnostic system 190 may output a warning 36 to the driver. The warning may be a visual warning provided via a specific indicator on the dashboard, to a display screen or projected on a Head Up Display (HUD) and/or verbally via a speech synthesizer. In some embodiments or configurations, the diagnostic system 190 may output specific information to the driver and in some embodiments or configurations, a general warning that service is required may be provided to the driver, and subsequently, at a service station, for example, a technician may be able to access the output 290 from the diagnostic system 190 to understand the nature of the problem.

Thus the embodiments provide additional functionality to the lane centering controller 100.

It will be appreciated therefore, that embodiments of the present lane centering controller 100 include embedded diagnosis functionality. This diagnosis functionality may provide enhanced reliability and accuracy of the lane centering controller 100 and allows diagnosis of malfunctions.

The additional functionality provides the diagnosis by utilizing information provided by the lane centering sensors and algorithm. It will be appreciated that in embodiments where the lane centering system is software based, rather than being hard wired into a chip, no additional hardware or architecture design is required.

With the diagnosis function, provided by an embedded diagnostic system 190, the overall lane centering controller 100 is self-contained.

Figure 4:
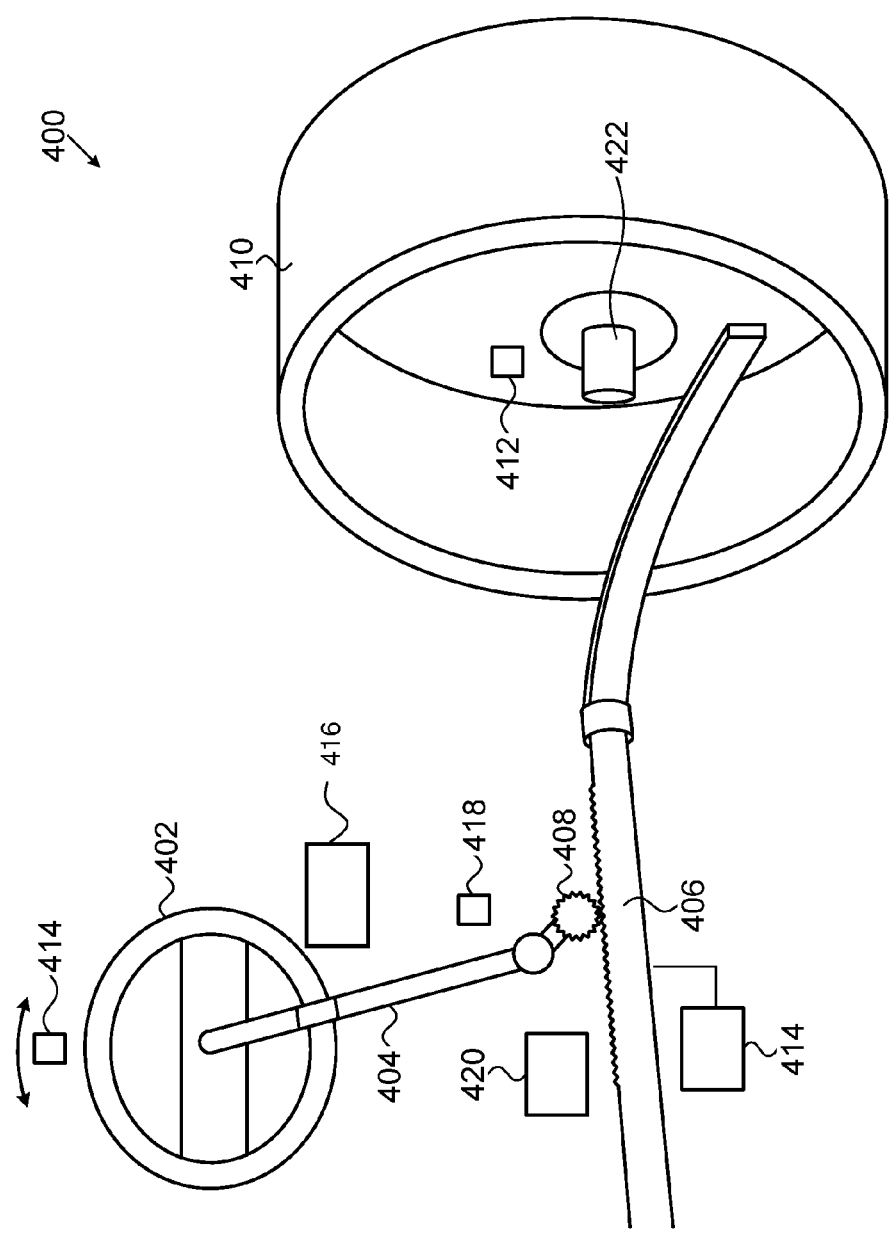
FIG. 4 is a schematic illustration of a generalized steering system.

Referring to FIG. 4, the vehicle steering system 400 may include an automated steering system (ASS) 420, installed in the vehicle, according to embodiments of the invention.

Vehicle steering system 400 may include a steering wheel 402 connected to a steering column 404. The steering column 404 may be connected to a rack 406 and pinion 408, which converts or transforms the rotary motion of the steering wheel 402 and steering column 404 into linear motion or displacement of the vehicle wheels 410. A steering angle sensor 412 may be mounted to the steering wheel 410, steering column 404, to an EPS system 414, to an AFS system 416, or otherwise be associated with the automated steering control system 420. A steering torque sensor 418, such as a steering torsion bar, torsion sensor, torquemeter, torque transducer, or other device, may be mounted to the steering wheel 402, the steering column 404, to the rack 406 and pinion 408 or to the wheel axle or spindle 422, or be otherwise associated with the automated steering system 420. Steering torque sensor 418 and steering angle sensor 412 may, in some embodiments, be associated with or mounted on EPS 414, AFS 416, or other steering system.

In some embodiments, the vehicle 10 may include one or more devices or sensors to measure vehicle steering control, vehicle steering conditions, vehicle steering parameters, vehicle dynamics, driver input, or other vehicle related conditions or measurements.

Referring back to FIG. 1, the vehicle dynamics measurement devices may also include one or more accelerometers 72, speedometers 74, wheel speed sensors 76, inertial measurement units (IMU) 78, or other devices. The vehicle dynamics measurement device(s) may measure vehicle dynamics conditions or driver input including steering angle, steering torque, steering direction, angular acceleration, linear acceleration, yaw-rate, lateral and longitudinal velocity, speed, wheel rotation, and other vehicle dynamics characteristics of vehicle 10. The measured vehicle dynamics, vehicle conditions, steering measurements, steering conditions, or driver input information may be transferred to the lane center controller 100 via, for example, a wire link such as a controller area network (CAN) bus 40, Flexray or Ethernet, or via a wireless link. The measured vehicle dynamics, vehicle conditions, steering measurements, steering conditions, or driver input information data may be used by lane center controller 100 or other system to calculate steering angle, steering torque, dead reckoning based vehicle position, and other calculations.

In some embodiments, the lane center controller 100 may be included within a vehicle automated control system that may be or may include a computing device mounted on the dashboard of the vehicle, in the passenger compartment 50, or in the trunk 60.

In some embodiments, the lane center controller 100 may be located in another part of the vehicle, may be distributed and located in multiple parts of the vehicle. Although typically, the lane center controller 100 is an onboard device, conceivably, part or all of the functionality of the lane center controller 100 may be remotely located (e.g., in a remote server or in a portable computing device such as a cellular telephone, for example.

While various sensors and inputs are discussed, in certain embodiments only a subset (e.g. one) type of sensor or input may be used.

Figure 5:
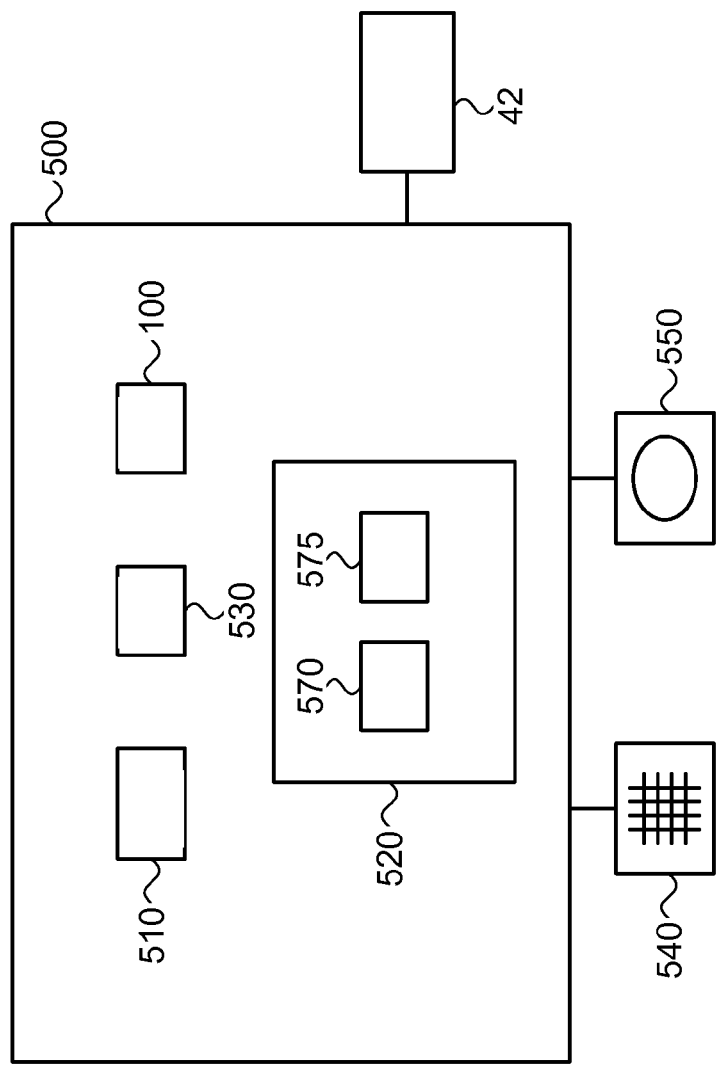
FIG. 5 is a an overview of a steering override system including the lane centering controller of FIG. 2 according to an embodiment of the invention.

FIG. 5 is a schematic diagram of a vehicle automated control system (ACS) 500 according to embodiments of the invention. The automated control system 500 may provide autonomous or automated steering override, and will include a lane centering controller 100, that in addition to the conceptual sub-systems thereof as described hereinabove with reference to FIG. 2, to provide the functionality described in FIG. 3, may include or be coupled with one or more processors or controllers 510, memory 520, long term storage 530, user input components 540, and output components 550. It may also be coupled to a GPS 42, for example.

User input components 540 may include, for example, a touch screen, a keyboard, microphone, pointer device, or other device. Output components 550 may include, for example, a display, screen, audio device such as speaker or headphones, or other device.

Input components 540 and output components 550 may be combined into, for example, a touch screen display and input which may be part of or coupled with the lane center controller 100.

The lane centering controller 100 may include one or more databases 570, which may include, for example, steering angle thresholds, steering torque thresholds, steering inertia information, steering damping information, steering stiffness information, and other information or data. Databases 570 may include maps 575 and be stored all or partly in one or both of memory 520, long term storage 530, or another device.

The processor or controller 510 may be, for example, a central processing unit (CPU), a chip or any suitable computing or computational device. Processor or controller 510 may include multiple processors, and may include general-purpose processors and/or dedicated processors such as graphics processing chips. Processor 510 may execute code or instructions, for example, stored in memory 520 or long-term storage 530, to provide the functionality of the embodiments and to implement aspects of the present invention.

Memory 520 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 520 may be or may include multiple memory units.

Long term storage 530 may be or may include, for example, a hard disk drive, a floppy disk drive, a Compact Disk (CD) drive, a CD-Recordable (CD-R) drive, a flash memory coupled via a universal serial bus (USB) or other suitable removable and/or fixed storage unit, and may include multiple or a combination of such units.

Figure 6:
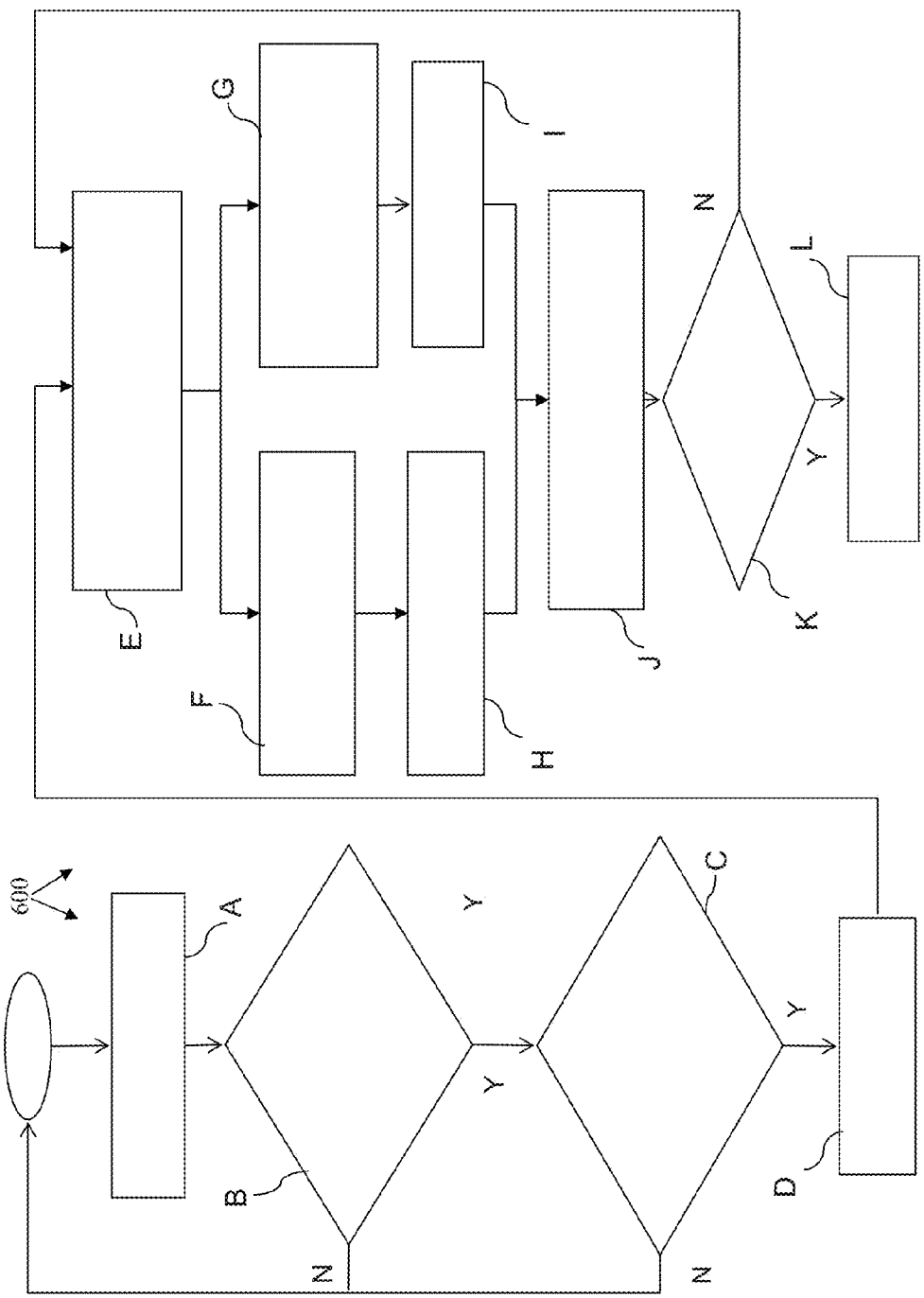
FIG. 6 is a flowchart of one method of operation of a lane centering controller according to an embodiment of the invention.

With reference to FIG. 6, a flowchart 600 of one method for self-diagnosis of malfunctions by a lane centering controller 100 (FIG. 2) is described.

It is appreciated that lane centering systems are, where provided, generally optionally implementable and optionally disabled by the driver, both for safety and for driver comfort. The first step in the method for self-diagnosis of malfunctions using the lane centering controller 100 requires checking if the lane centering system is engaged or disengaged (step A). If the lane centering system is disengaged, the lane centering controller 100 checks if the driver is requesting lane centering assistance (step B). If the driver is not requesting lane centering assistance, the lane centering disengagement (step A) is rerun. This loop may be tested continuously during a journey, at particular points of a journey such as when the vehicle 10 starts to move from a substantially stationary position, such as where the onboard computer detects freeway or highway driving, or where a GPS system is activated, or only during on-road driving, for example. In other embodiments, implementations or configuration states, the loop may be tested intermittently such as every one or several kilometers or one or several seconds or minutes.

If the driver is requesting lane centering assistance (step B), the controller checks that lane centering facility is actually available (step C), it being appreciated that, like any computer implemented electronic control system, the lane centering system or subsystem, may sometimes not be available for activation. Furthermore, in some embodiments, it may be actively disabled.

Where the lane centering system or subsystem is available, the lane centering system is engaged (step D). The steering controller 120 then calculates (step E) the appropriate lane centering adjustment and applies it to the steering system 130 (step F). In parallel, the same steering command 220 (Shown in FIG. 3) that is applied to the steering system 130 is applied to the virtual vehicle dynamics module 170 (step G). The actual vehicle motion caused by the steering adjustment (step F) is recorded (step H) and the anticipated vehicle motion from the virtual vehicle dynamics module 170 is calculated (step I).

The comparer 180 compares (step J) the actual recorded motion and the calculated anticipated vehicle motion, over an appropriate distance. If the difference detected is less than a threshold amount, (i.e. no significant difference is detected), the steering controller 120 recalculates the appropriate lane centering adjustment again (step E), rerunning the loop.

If, however, a significant difference is detected (step K), i.e. a difference exceeding a predetermined threshold, diagnostic logic is run 290 by the diagnostic system 190 (step L).

Figure 7:
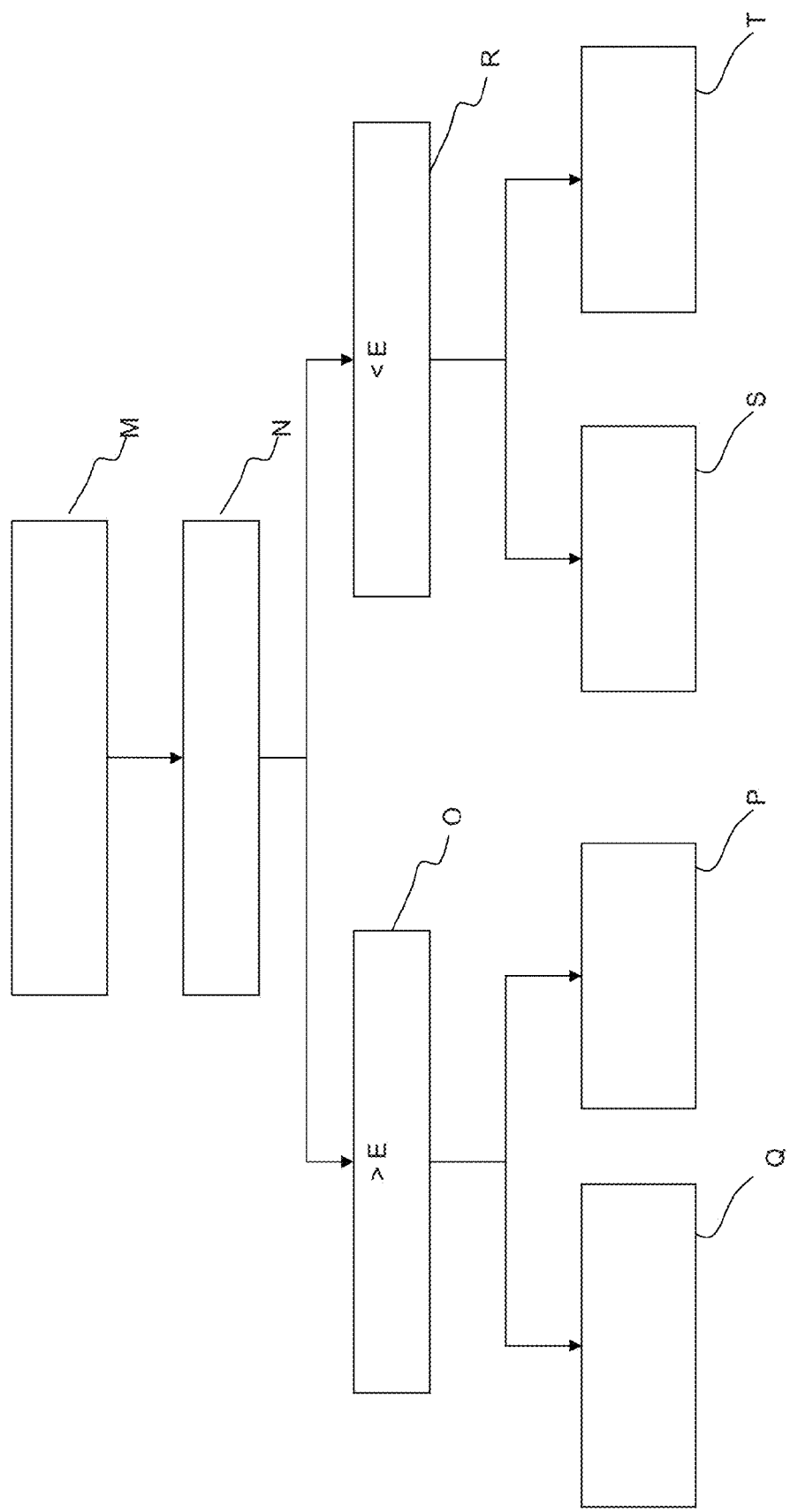
FIG. 7 is a flowchart of a diagnostic method performed by the diagnostic system according to an embodiment of the invention.

FIG. 7 is a flowchart of a diagnostic method performed by the diagnostic system, according to embodiments of the invention. A diagnostic system 190 of a lane centering controller 100 may provide improved functionality using the output of the virtual vehicle dynamics module 170, as compared 280 with the steering system 130 output by the comparer 180.

The diagnostic system 180 is able to diagnose and distinguish between externalities such as cross winds and the like, and wheel 410 imbalance, underpressured tire pressure, sensor mispositioning 20 and sensor 20 misalignment. The sensor 20, in this case, is typically, but not necessarily a camera, and persons of the art will have no difficulty generalizing the method for other sensor systems.

A malfunction diagnostic system 190 may receive (step M) the difference between the virtual vehicle dynamics 270 provided by the virtual vehicle dynamics module 170, and the actual steering adjustment from the steering controller 130 that is generated by the comparer 180. This is averaged (step N) over a significant distance, such as 100 km for example, thereby filtering out externalities such as cross winds and the like.

In some embodiments, where vehicle malfunction is not detected, such externalities may be displayed to the driver on a visual display or as an audible speech synthesized signal, to indicate road banking, cross-winds and the like, or a general warning such as a light or audible alarm may be activated.

If the detected discrepancy from the comparer 180 is consistent over time and not over a predetermined threshold, the diagnostic system 190 determines if the bias in steering torque exceeds a predetermined limit $\delta_{limit}$. Where the torque bias exceeds $\delta_{limit}$, the diagnostic system hypothesizes that the underlying cause is attributable to the steering system, whereas if the bias in steering torque is less than $\delta_{limit}$, the diagnostic system 190 assumes that the system is attributable to the sensor system.

Where the torque bias exceeds limit $\delta_{limit}$ (step O), the diagnostic system 190 applies a steering system diagnosis and looks at the match or mismatch of the rack 406 position of the rack 406 and pinion 408 steering system.

If there is a rack 406 position match (step O) and unbalanced steering torque (p), the likely cause is determined to be caused by wheel imbalance or underpressured tires (step Q). If there is a rack position mismatch (step P) the steering system (often EPS 130) is determined as being biased.

Where the bias in the steering torque is less than $\delta_{limit}$ (step R), the driver's preferred lane offset is monitored, it being appreciated that some drivers prefer to be near the middle of the road and others tend to be close to one side of the lane. If the preferred offset is always biased, this may indicate a camera mispositioning (step S). If there is a continuous oscillatory motion even when travelling relatively straight roads, the indication is a camera misalignment in yaw angle (step T).

Thus the diagnostic system 190 may differentiate between:
externalities such as cross-winds and banking
mechanical malfunctioning of the steering system such as wheel imbalance, mis-alignment, flat tires and EPS torque balance, and
lane sensor or camera mis-alignment Over distance, the effect of cross-winds and banking may be neutralized over time. Cross-wind effects may be neutralized by the vehicle changing direction, as detected using a global positioning system (GPS) a compass, for example. The effect of camera 22 or sensor 20 mis-alignment detection can be used to correct the alignment and may also be used for loss damage waiver purposes.

Poor wheel alignment may cause a more noticeable discrepancy at high speed.

It will be appreciated that in general, under-inflated tires require more energy to begin moving and to maintain speed. As such, under-inflated tires contribute to pollution and increase fuel costs. Under-inflated tires contribute to poor control. Vehicles with under-inflated tires require longer stopping distances and skid longer on wet surfaces.

Properly inflated tires are safer and less likely to fail at high speeds and also wear more evenly and generally last longer.

When a tire is overinflated, it cannot compress and spread impact over its entire surface.

Over-inflated tires may lead to excess damage when driving over uneven sections of road and/or potholes. This may lead to a rougher ride, as the tire cannot cushion the weight of the car as well. Over-inflation may cause the tire to bulge out along the center of the treads. This may result in a decrease in traction and stopping distance, since less of the tire is contacting the driving surface.

Consequently, it will be appreciated that diagnosing improper tire inflation pressures and alerting the driver is a valuable service.

The lane center controller 100 may provide adaptive lane centering, low speed lane centering and/or lane keeping assistance. The lane center controller 100 may be incorporated within a vehicle 10, such as a car, truck, lorry or other vehicle, as part of an automated lateral control system 90, which itself, may operate in conjunction with or separate from one or more additional automatic vehicle control systems, autonomous driving applications and automated steering systems.

The lane center controller 100 may, when engaged, fully or partially control the steering of vehicle 10 and reduce driver (e.g., operator of the vehicle) steering control input via the steering wheel 402 and/or steering system 400, which may include an electrical power steering (EPS) system 414 and/or other components.

Embodiments of the present invention may include apparatuses for performing the operations described herein. Such apparatuses may be specially constructed for the desired purposes, or may comprise computers or processors selectively activated or reconfigured by a computer program stored in the computers. Such computer programs may be stored in a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein. Embodiments of the invention may include an article such as a non-transitory computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Different embodiments are disclosed herein. Features of certain embodiments may be combined with features of other embodiments; thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A diagnostic, autonomous driving system comprising:
    a lane controller system configured to:
        receive a steering command,
        simultaneously apply the steering command to a steering controller and a virtual dynamics module configured to generate corresponding, at least one virtual vehicle dynamics directly from the steering command,
        capture at least one vehicle dynamic corresponding to the virtual vehicle dynamic during travel on a travel path resulting from the steering command, and initiate corrective action responsively to an average threshold disparity between the vehicle dynamics and the virtual vehicle dynamic; and
    a diagnostic system configured to identify a steering system malfunction responsively to detection of the average threshold disparity between the vehicle dynamic and the virtual vehicle dynamic wherein the steering system malfunction includes electrical-power-steering torque imbalance.

2. The diagnostic, autonomous driving system of claim 1, wherein the steering system malfunction further includes wheel misalignment.

3. The diagnostic, autonomous driving system of claim 1, wherein the steering system malfunction further includes under pressured tires.

4. The diagnostic, autonomous driving system of claim 1, wherein the at least one vehicle dynamics is selected from the group consisting of steering angle, steering torque, steering direction, angular acceleration, linear acceleration, yaw-rate, velocity, speed and wheel rotation.

5. The diagnostic, autonomous driving system of claim 1, wherein the lane controller system includes a link to at least one vehicle dynamics measurement device selected from the group consisting of an accelerometer, a speedometer, a wheel speed sensor, and an inertial measurement unit (IMU).

6. The diagnostic, autonomous driving system of claim 1, wherein the diagnostic system is further configured to issue a warning responsibly to detection of a steering system.

7. A diagnostic method in autonomous driving comprising:
    applying simultaneously a steering command received from an autonomous steering system to both a steering controller and a virtual dynamics module, the virtual dynamics module configured to generate at least one virtual vehicle dynamics of a predicted path resulting from the steering command;
    capturing at least one vehicle dynamic during travel on a travel path resulting from the steering command;
    initiating corrective action responsively to an average threshold disparity between the vehicle dynamics and the corresponding virtual vehicle dynamics; and
    identifying a steering system malfunction responsively to the average threshold disparity between the vehicle dynamics and the virtual vehicle dynamics wherein the steering system malfunction includes electrical-power-steering torque imbalance.

8. The diagnostic method of claim 7, wherein the at least one vehicle dynamics are selected from the group consisting of steering angle, steering torque, steering direction, angular acceleration, linear acceleration, yaw-rate, velocity, speed and wheel rotation.

9. The diagnostic method of claim 7, wherein the steering system malfunction further includes wheel misalignment.

10. The diagnostic method of claim 7, wherein the steering system malfunction further includes under pressured tires.

11. The diagnostic method of claim 7, further comprising issuing a warning responsively to detection of a steering system malfunction.

* * * * *